(12) United States Patent
Wang et al.

(10) Patent No.: US 10,958,817 B1
(45) Date of Patent: Mar. 23, 2021

(54) METHOD FOR DETERMINING CAMERA MODULE ASSEMBLING QUALITY

(71) Applicant: PRIMAX ELECTRONICS LTD., Taipei (TW)

(72) Inventors: Hsiu-Wen Wang, Taipei (TW); Chih-Wen Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/858,850

(22) Filed: Apr. 27, 2020

(30) Foreign Application Priority Data

Feb. 14, 2020 (TW) .................................. 109104761

(51) Int. Cl.
*H04N 5/225* (2006.01)
*H04N 5/262* (2006.01)

(52) U.S. Cl.
CPC ......... *H04N 5/2257* (2013.01); *H04N 5/2628* (2013.01)

(58) Field of Classification Search
CPC .................................................. H04N 5/2257
See application file for complete search history.

(56) References Cited

U.S. PATENT DOCUMENTS 9,516,302 B1 * 12/2016 Cao .......................... G02B 27/62
2020/0366814 A1 * 11/2020 Dan ....................... H04N 17/002

* cited by examiner

*Primary Examiner* — Christopher K Peterson
(74) *Attorney, Agent, or Firm* — WPAT, PC

(57) ABSTRACT

A method for determining camera module assembling quality is provided. The method includes a step of determining whether the shooting position and the shooting posture of and under-test camera module are correct according to a result of judging whether a relationship between the world coordinate of at least one chart characteristic point of a reference chart and the image coordinate of a corresponding image characteristic point of an image plane coordinate system complies with a standard relationship. Then, the under-test camera module at the correct shooting position and with the correct shooting posture is used to shoot the reference chart. Consequently, an assembling information of the under-test camera module is obtained.

10 Claims, 3 Drawing Sheets

METHOD FOR DETERMINING CAMERA MODULE ASSEMBLING QUALITY

FIELD OF THE INVENTION

The present invention relates to an optical field, and more particularly to a method of determining assembling quality of a camera module.

BACKGROUND OF THE INVENTION

Recently, with the development of electronic industries and the advance of industrial technologies, various electronic devices are designed toward small size, light weightiness and easy portability. Consequently, these electronic devices can be applied to mobile business, entertainment or leisure purposes whenever or wherever the users are. For example, various camera modules are widely used in many kinds of fields such as smart phones, wearable electronic devices or any other appropriate portable electronic devices. Since the electronic devices are small and portable, the users can take the electronic devices to capture images and store the images according to the practical requirements. Alternatively, the images can be uploaded to the internet through mobile networks. In other words, these electronic devices not only have important commercial values but also provide more colorful lives to people.

Generally, the assembling quality of the camera module is one of the most important factors that influence the imaging performance of the camera module. Consequently, the worker in the production line detects the camera module before the camera module leaves the factory. A method of detecting the camera module will be described as follows. Firstly, the under-test camera module is used to shoot a reference chart with a specified pattern. Then, an image analysis is performed on the image of the captured image of the reference chart in order to determine the assembling quality of the camera module. For example, the assembling quality of the camera module is determined according to the result of judging whether there is a tilt angle between a sensing element and a lens of the camera module.

Before the under-test camera module shoots the reference chart, it is necessary to confirm that the under-test camera is at the correct shooting position and with the correct shooting posture. For example, it is necessary to confirm that the distance between the camera module and the reference chart is correct and the camera module is in parallel with the reference chart. According to the conventional technologies, a through focus method, an ISO12233 resolution test method and/or a spatial frequency response (SFR) calculation method are employed. However, the conventional technologies still have some drawbacks. For example, each under-test camera module has to shoot the reference chart many times in order to complete the calibration process. In other words, the calibration process is complicated and lengthy and needs to be improved.

SUMMARY OF THE INVENTION

An object of the present invention provides a method for determining camera module assembling quality. The method includes a step of determining whether the shooting position and the shooting posture of and under-test camera module are correct according to a result of judging whether a relationship between the world coordinate of at least one chart characteristic point of a reference chart and the image coordinate of a corresponding image characteristic point of an image plane coordinate system complies with a standard relationship. Then, the under-test camera module at the correct shooting position and with the correct shooting posture is used to shoot the reference chart. Consequently, an assembling information of the under-test camera module is obtained.

In accordance with an aspect of the present invention, a method for determining camera module assembling quality includes the following steps. Firstly, a reference chart having plural chart characteristic points is provided. Each chart characteristic point has a world coordinate in a world coordinate system. Then, an under-test camera module at a shooting position and with a shooting posture is used to shoot the reference chart, so that a first image is formed on an imaging plane of the under-test camera module. The first image contains plural image characteristic points corresponding to the plural chart characteristic points of the reference chart. Each image characteristic point has an image coordinate in an image plane coordinate system. Then, a determining step is performed to determine whether the shooting position and the shooting posture of the under-test camera module are correct according to a result of judging whether a relationship between the world coordinate of at least one of the plural chart characteristic points and the image coordinate of the corresponding image characteristic point complies with a standard relationship. Then, the under-test camera module at the correct shooting position and with the correct shooting posture is used to shoot the reference chart, so that a second image is obtained. After the second image is subjected to an image processing process, an assembling information of the under-test camera module is obtained.

In an embodiment, the standard relationship is expressed by a mathematic formula:

$$q=K[R|T]Q$$

wherein q is the image coordinate of the image characteristic point in the image plane coordinate system, K is an internal parameter matrix of the under-test camera module, $[R|T]$ is an external parameter matrix of the under-test camera module, and Q is the word coordinate of the characteristic point in the world coordinate system.

In an embodiment, the internal parameter matrix K is expressed by a mathematic formula:

$$K = \begin{bmatrix} f & 0 & u_0 & 0 \\ 0 & f & v_0 & 0 \\ 0 & 0 & 1 & 0 \end{bmatrix}$$

wherein f is a focal length of the under-test camera module, and $u_0$ and $v_0$ are coordinates of an image center of the image plane coordinate system.

In an embodiment, the external parameter matrix $[R|T]$ is expressed by a mathematic formula:

$$[R|T] = \begin{bmatrix} r11 & r12 & r13 & T_x \\ r21 & r22 & r23 & T_y \\ r31 & r32 & r33 & T_z \\ 0 & 0 & 0 & 1 \end{bmatrix}$$

wherein R is a rotation matrix, and T is a translation matrix.

In an embodiment, the internal parameter matrix and the external parameter matrix are obtained by using a standard camera module with qualified assembling quality to shoot the reference chart at different positions and at different angles.

In an embodiment, the reference chart is a checkerboard chart, and the plural chart characteristic points are corner points of the checkerboard chart.

In an embodiment, after the image processing process, a distorted portion of the second image is compensated, so that the second image is processed into a undistorted second image. The assembling information of the under-test camera module is obtained according to an analysis result of a difference between the undistorted second image and the reference chart.

In an embodiment, the second image is processed into the undistorted second image according to a distortion coefficient set.

In an embodiment, the distortion coefficient set contains a tangential distortion coefficient set and a radial distortion coefficient set.

In an embodiment, a sensing element and a lens of the under-test camera module are aligned with each other through an active alignment machine, and the active alignment is adjusted according to the assembling information.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
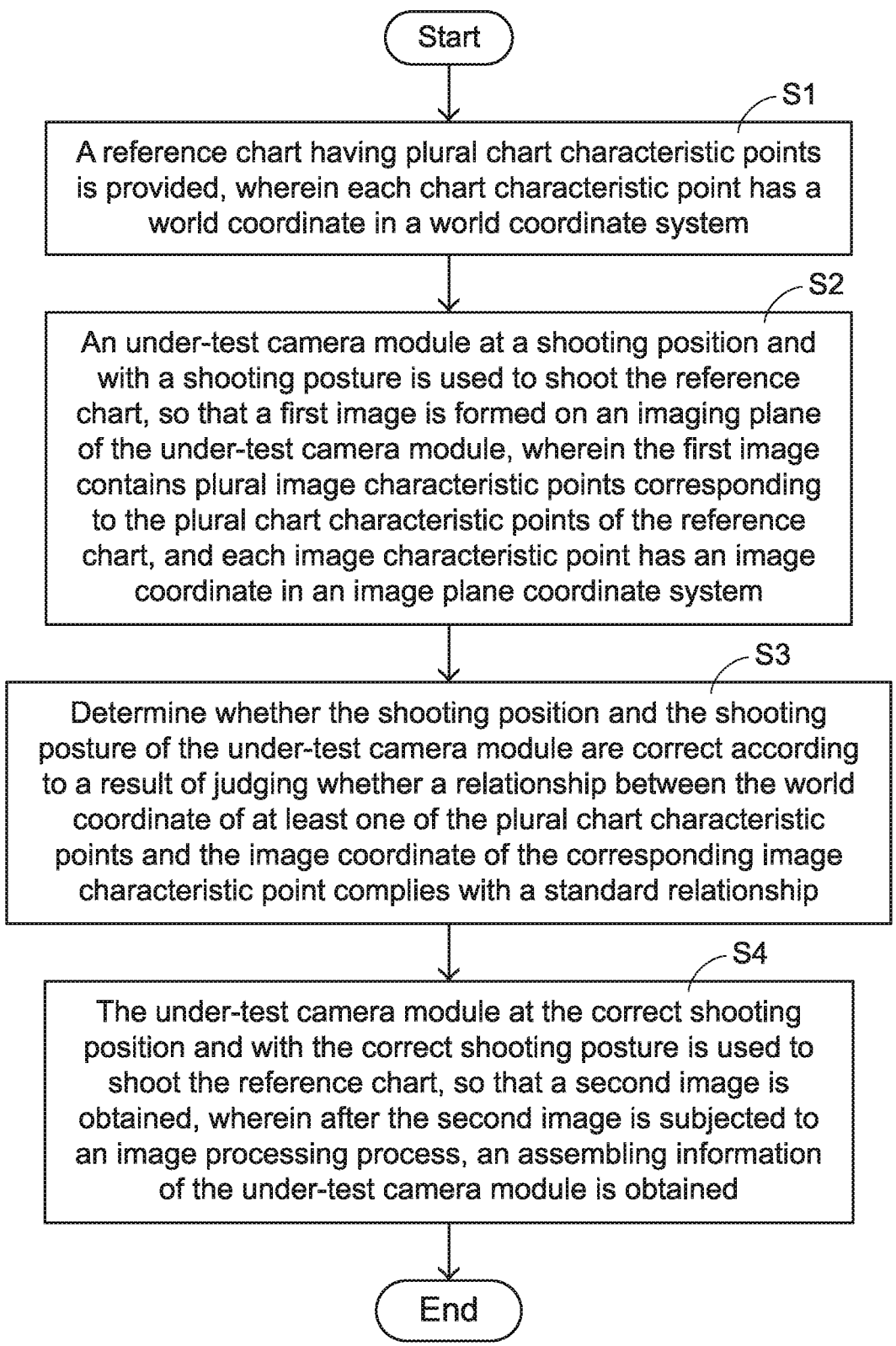
FIG. 1 is a flowchart illustrating a method of determining assembling quality of a camera module according to an embodiment of the present invention.

The embodiments of present invention will be described more specifically with reference to the following drawings. Generally, in the drawings and specifications, identical or similar components are designated by identical numeral references. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 2:
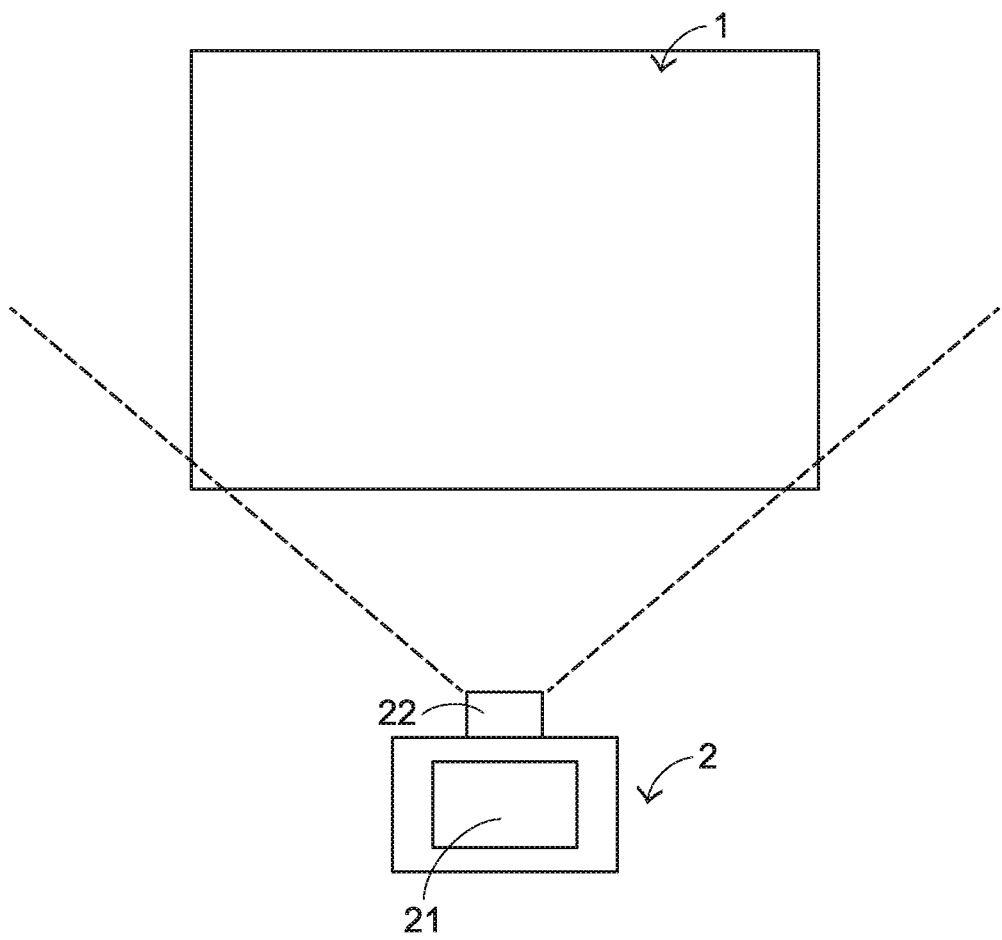
FIG. 2 schematically illustrates the scenario of using the method of FIG. 1.
Figure 3:
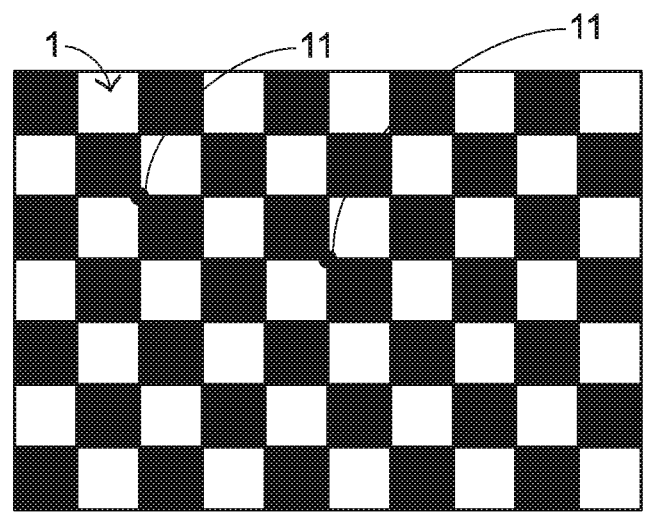
FIG. 3 schematically illustrates a reference chart used in the method of FIG. 1.
Figure 4:
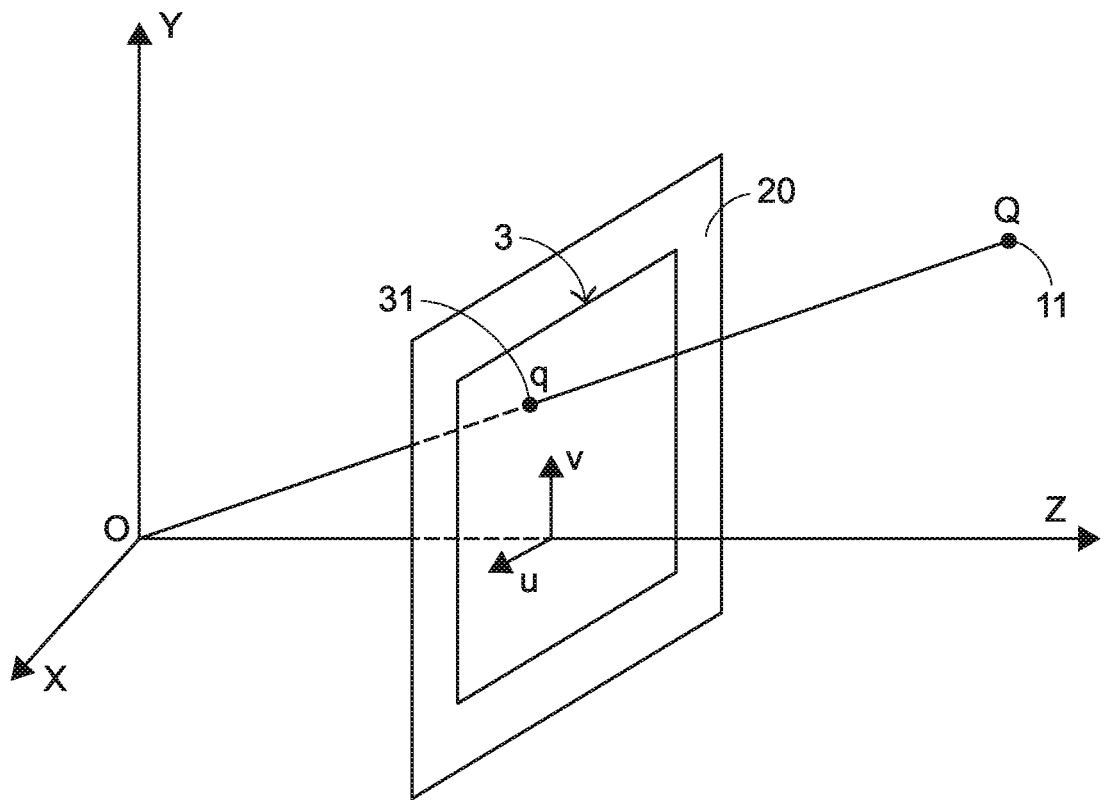
FIG. 4 schematically illustrates the concept of converting a world coordinate into an image coordinate in the method of FIG. 1.

Please refer to FIGS. 1, 2, 3 and 4. FIG. 1 is a flowchart illustrating a method of determining assembling quality of a camera module according to an embodiment of the present invention. FIG. 2 schematically illustrates the scenario of using the method of FIG. 1. FIG. 3 schematically illustrates a reference chart used in the method of FIG. 1. FIG. 4 schematically illustrates the concept of converting a world coordinate into an image coordinate in the method of FIG. 1.

Firstly, in a step S1, a reference chart 1 is provided. As shown in FIG. 3, the reference chart 1 contains plural chart characteristic points 11. For succinctness, only two chart characteristic points are shown in FIG. 3. In the embodiment of FIG. 3, the reference chart 1 is a checkerboard chart. Moreover, the plural chart characteristic points 11 are corner points of the checkerboard chart. That is, the chart characteristic point is the intersection between two adjacent black squares or the intersection between two adjacent white squares. Moreover, each chart characteristic point 11 has a world coordinate in a world coordinate system. As shown in in FIG. 4, the world coordinate system is defined by X, Y and Z coordinate axes.

In a step S2, an under-test camera module 2 at a shooting position and with a shooting posture shoots the reference chart 1, and thus a first image 3 is formed on an imaging plane 20 of the under-test camera module 2 (see FIG. 4). The first image 3 contains plural image characteristic points 31 corresponding to the plural chart characteristic points 11 of the reference chart 1. For succinctness, only one chart characteristic point 11 and the corresponding image characteristic point 31 are shown in FIG. 4. Moreover, each image characteristic point 31 has an image coordinate in an image plane coordinate system. As shown in in FIG. 4, the planar coordinate system is defined by u and v coordinate axes.

Then, a step S3 is performed to determine whether the shooting position and the shooting posture of the under-test camera module 2 are correct according to a result of judging whether a relationship between the world coordinate of the at least one chart characteristic point 11 and the image coordinate of the corresponding image characteristic point 31 complies with a standard relationship. If the world coordinate of the chart characteristic point 11 and the image coordinate of the corresponding image characteristic point 31 complies with the standard relationship, it is determined that the shooting position and the shooting posture of the under-test camera module 2 are correct. That is, the shooting position is the correct shooting position, and the shooting posture is the correct shooting posture.

Please refer to FIG. 4 again. If the shooting position and the shooting posture of the under-test camera module 2 are correct, it is confirmed that the distance between the under-test camera module 2 and the reference chart 1 is correct and the under-test camera module 2 is in parallel with the reference chart 1.

In an embodiment, the standard relationship is expressed by the following mathematic formula:

$$q=K[R|T]Q$$

In the above mathematic formula, q is the image coordinate of the image characteristic points 31 in the image plane coordinate system, K is an internal parameter matrix of the under-test camera module 2, [R|T] is an external parameter matrix of the under-test camera module 2, and Q is the word coordinate of the chart characteristic point 11 in the world coordinate system.

Preferably, the internal parameter matrix K and the external parameter matrix [R|T] may be expressed by following mathematic formulae:

$$K = \begin{bmatrix} f & 0 & u_0 & 0 \\ 0 & f & v_0 & 0 \\ 0 & 0 & 1 & 0 \end{bmatrix}, [R|T] = \begin{bmatrix} r11 & r12 & r13 & T_x \\ r21 & r22 & r23 & T_y \\ r31 & r32 & r33 & T_z \\ 0 & 0 & 0 & 1 \end{bmatrix};$$

In the above mathematic formulae, f is a focal length of the under-test camera module 2, $u_0$ and $v_0$ are the coordinates of the image center of the image plane coordinate system, R is a rotation matrix, and T is a translation matrix.

In an embodiment, the internal parameter matrix K and the external parameter matrix [R|T] are obtained by using a standard camera module to perform several shooting actions at different positions and at different angles and estimating the shooting results according to a maximum likelihood estimation (MLE) method. The standard camera module is a camera module with acceptable assembling quality. The methods of obtaining the internal parameter matrix K and the external parameter matrix [R|T] are well known to those skilled in the art, and not redundantly described herein.

In a step S4, the under-test camera module 2 at the correct shooting position and with the correct shooting posture shoots the reference chart 1, and thus a second image is obtained. After the second image is subjected to an image processing process, the assembling information of the under-test camera module 2 is obtained.

In an embodiment of the image processing process, the distorted portion of the second image is compensated according to a distortion coefficient set. Consequently, the distorted second image is processed into an undistorted second image. Then, the difference between the undistorted second image and the reference chart 1 (e.g., the pixel difference between two corresponding characteristic points) is analyzed. Consequently, the assembling information of the under-test camera module 2 is obtained. For example, the result of judging whether there is a tilt angle between a sensing element 21 and a lens 22 of the under-test camera module 2 is obtained. If the title angle exists, an active alignment (AA) machine is used to adjust the alignment between the sensing element 21 and the lens 22 of the under-test camera module 2. Moreover, the distortion coefficient set contains a tangential distortion coefficient set and a radial distortion coefficient set. The method of acquiring the distortion coefficient set is well known to those skilled in the art, and not redundantly described herein.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for determining camera module assembling quality, the method comprising steps of:
   providing a reference chart having plural chart characteristic points, wherein each chart characteristic point has a world coordinate in a world coordinate system;
   using an under-test camera module at a shooting position and with a shooting posture to shoot the reference chart, so that a first image is formed on an imaging plane of the under-test camera module, wherein the first image contains plural image characteristic points corresponding to the plural chart characteristic points of the reference chart, and each image characteristic point has an image coordinate in an image plane coordinate system;
   determining whether the shooting position and the shooting posture of the under-test camera module are correct according to a result of judging whether a relationship between the world coordinate of at least one of the plural chart characteristic points and the image coordinate of the corresponding image characteristic point complies with a standard relationship; and
   allowing the under-test camera module at the correct shooting position and with the correct shooting posture to shoot the reference chart, so that a second image is obtained, wherein after the second image is subjected to an image processing process, an assembling information of the under-test camera module is obtained.

2. The method according to claim 1, wherein the standard relationship is expressed by a mathematic formula:

$$q=K[R|T]Q$$

wherein q is the image coordinate of the image characteristic point in the image plane coordinate system, K is an internal parameter matrix of the under-test camera module, [R|T] is an external parameter matrix of the under-test camera module, and Q is the word coordinate of the characteristic point in the world coordinate system.

3. The method according to claim 2, wherein the internal parameter matrix K is expressed by a mathematic formula:

$$K = \begin{bmatrix} f & 0 & u_0 & 0 \\ 0 & f & v_0 & 0 \\ 0 & 0 & 1 & 0 \end{bmatrix}$$

wherein f is a focal length of the under-test camera module, and $u_0$ and $v_0$ are coordinates of an image center of the image plane coordinate system.

4. The method according to claim 2, wherein the external parameter matrix [R|T] is expressed by a mathematic formula:

$$[R|T] = \begin{bmatrix} r11 & r12 & r13 & T_x \\ r21 & r22 & r23 & T_y \\ r31 & r32 & r33 & T_z \\ 0 & 0 & 0 & 1 \end{bmatrix}$$

wherein R is a rotation matrix, and T is a translation matrix.

5. The method according to claim 2, wherein the internal parameter matrix and the external parameter matrix are obtained by using a standard camera module with qualified assembling quality to shoot the reference chart at different positions and at different angles.

6. The method according to claim 1, wherein the reference chart is a checkerboard chart, and the plural chart characteristic points are corner points of the checkerboard chart.

7. The method according to claim 1, wherein after the image processing process, a distorted portion of the second image is compensated, so that the second image is processed into a undistorted second image, wherein the assembling information of the under-test camera module is obtained according to an analysis result of a difference between the undistorted second image and the reference chart.

8. The method according to claim 7, wherein the second image is processed into the undistorted second image according to a distortion coefficient set.

9. The method according to claim 8, wherein the distortion coefficient set contains a tangential distortion coefficient set and a radial distortion coefficient set.

10. The method according to claim 1, wherein a sensing element and a lens of the under-test camera module are aligned with each other through an active alignment machine, and the active alignment is adjusted according to the assembling information.

* * * * *